(12) United States Patent
Pishock, Jr.

(10) Patent No.: US 12,479,657 B2
(45) Date of Patent: Nov. 25, 2025

(54) SYSTEM AND DEVICE FOR AUTOMATION AND SAFETY FOR A VEHICLE OR TRAILER WITH LIFT ARMS

(71) Applicant: Charles Thomas Pishock, Jr., Schuylkill Haven, PA (US)

(72) Inventor: Charles Thomas Pishock, Jr., Schuylkill Haven, PA (US)

( * ) Notice: Subject to any disclaimer, the term of this patent is extended or adjusted under 35 U.S.C. 154(b) by 519 days.

(21) Appl. No.: 18/147,151

(22) Filed: Dec. 28, 2022

(65) Prior Publication Data

US 2024/0217733 A1    Jul. 4, 2024

(51) Int. Cl.
| | |
|---|---|
| *B65F 3/04* | (2006.01) |
| *B60W 10/30* | (2006.01) |
| *B60W 30/09* | (2012.01) |
| *B65F 3/06* | (2006.01) |
| *B66F 9/20* | (2006.01) |
| *B66F 9/22* | (2006.01) |

(52) U.S. Cl.
CPC .............. *B65F 3/04* (2013.01); *B60W 30/09* (2013.01); *B65F 3/06* (2013.01); *B66F 9/205* (2013.01); *B66F 9/22* (2013.01); *B60W 10/30* (2013.01)

(58) Field of Classification Search
CPC . B65F 3/04; B65F 3/06; B60W 30/09; B60W 10/30; B66F 9/205; B66F 9/22
See application file for complete search history.

(56) References Cited

U.S. PATENT DOCUMENTS

| | | | |
|---|---|---|---|
| 2,824,655 A * | 2/1958 | Harbers | B65F 3/046 |
| | | | 414/551 |
| 3,464,755 A | 9/1969 | Brown | |
| 4,988,974 A | 1/1991 | Fury et al. | |
| 5,954,470 A | 9/1999 | Duell et al. | |
| 7,325,880 B2 | 2/2008 | Gapski | |
| 7,559,734 B2 * | 7/2009 | Khan | B60P 1/006 |
| | | | 298/22 C |
| 7,831,352 B2 | 11/2010 | Laumer et al. | |
| 9,738,206 B2 | 8/2017 | Scheer et al. | |
| 10,745,197 B2 | 8/2020 | Peek et al. | |
| 10,831,201 B2 | 11/2020 | Spence | |
| 11,099,560 B2 | 8/2021 | Smith et al. | |

(Continued)

FOREIGN PATENT DOCUMENTS

| | | | | |
|---|---|---|---|---|
| CN | 215618092 U | * | 1/2022 | |
| WO | WO-2019180843 A1 | * | 9/2019 | G06V 20/58 |

OTHER PUBLICATIONS

CN-215618092-U (Year: 2022).*
WO-2019180843-A1 (Year: 2019).*

*Primary Examiner* — Ernesto A Suarez
*Assistant Examiner* — Laurence R Brothers
(74) *Attorney, Agent, or Firm* — Dunlap Bennett & Ludwig, PLLC

(57) ABSTRACT

A system for automation of a vehicle or trailer with lift arms including a dump bed with lift arms and one or more hydraulic valves operative to lifting the lift arms, hydraulic sensors joined to each hydraulic valve, a bucket on an end of the lift arms, a camera positioned to view a rear of the dump bed, and a computer program product which monitors a surrounding area by the camera, positions the bucket by lifting the lift arms by operation of the hydraulic valve, and ceases positioning of the bucket upon detection of an obstacle or safety hazard.

7 Claims, 4 Drawing Sheets

(56) References Cited

U.S. PATENT DOCUMENTS

| | | | |
|---|---|---|---|
| 2015/0308070 A1* | 10/2015 | Deines | E02F 3/434 |
| | | | 701/50 |
| 2016/0201408 A1 | 7/2016 | Little et al. | |
| 2017/0362030 A1 | 12/2017 | Steimel | |
| 2020/0242944 A1* | 7/2020 | Barberis | G08G 1/202 |
| 2021/0122201 A1 | 4/2021 | Davis | |
| 2021/0148083 A1* | 5/2021 | Taylor | G05D 1/0225 |
| 2021/0261032 A1 | 8/2021 | Hayes et al. | |
| 2021/0345062 A1* | 11/2021 | Koga | H04W 4/029 |

* cited by examiner

SYSTEM AND DEVICE FOR AUTOMATION AND SAFETY FOR A VEHICLE OR TRAILER WITH LIFT ARMS

BACKGROUND OF THE INVENTION

The present invention relates to vehicles and trailers with lift arms and, more particularly, to a system and device for automation and safety thereof.

Vehicles or trailers with lift arms, such as dual arm or bulk grease body truck or trailer, operate by hydraulic, mechanical systems mounted on a dump trailer or dump truck body to pick up various kinds of waste products. These products are often in containers ranging from household trash cans to multi-yard commercial bulk containers.

A "dual arm" includes two arms mounted, one on either side of the body and anchored by a trunnion shaft in the body floor. A bucket or forks are attached to the opposite end of the two arms. Hydraulic cylinders operate the arms to lift the waste product over and into a dump bed. A first set of hydraulic cylinders may be arm cylinders that lift the bucket off the ground and continues over top the bed. A second set may be bucket cylinders which tilt the bucket to dump the product into the bed. The system is stowed in a rest during transport.

A "bulk grease" is a hydraulic/mechanical system mounted on a dump trailer or dump truck body to pick up various kinds of waste products in multi-yard commercial bulk containers. The bulk grease includes two arms mounted, one on either side of the body and anchored by a trunnion shaft in the body floor. A chain roller and a lifting chain are attached to an opposite end of said arms. This system has one set of hydraulic cylinder arms to lift the waste product over and into the dump bed. The chain roller and lifting chain are attached to the other end of the arms and attach to a bulk grease container. They then lift and secure the container near a roller. Arm cylinders then lift the container off the ground and continue over top the bed. The chain roller lowers the container into the bed where a set of pockets invert the bulk container to dump product into the bed. The system is stowed in a rest during transport.

Using either a bulk grease, a dual arm, or similar devices, an operator may arrive at a site and energize electric and hydraulic system power from a dual arm unit. The operator may then operate the operating station utilizing controls on a hydraulic spool valve or may alternatively operate a wireless remote. The operator may manipulate the bucket out of a travel rest and set the bucket on the ground. The operator may put waste containers into the bucket by hand. The operator may then utilize the present invention to lift, position and/or orient (e.g., tilt) the bucket to clear the travel rest while attempting to limit spill of product in the bucket. Once the bucket is in a proper position over a truck or dump site, the operator may dump the bucket. The bucket is then returned to remove emptied containers. The process may be repeated until there are no more full containers. Upon completion, the operator may secure the bucket to the travel rest and deenergize the hydraulic and electrical system.

The described use entails manual manipulation by the operator. Experience with the system, experience of the operator, ability, habits, personality, and attention may contribute to performance. There are no controls currently in place that provide limits and finesse.

Furthermore, there are no safety parameters in place to halt operation of the system. Should there be interference with the system, such as an object in the way or a limitation of the system exceeded, there are no safety devices in place for protection of the operator or for people and things in the vicinity of the device, including the device itself.

As can be seen, there is a need for a system and/or device that provides safety features, automatic control, and enhanced controls of a dual arm of bulk grease truck or trailer.

SUMMARY OF THE INVENTION

In one aspect of the present invention, a system for automation of a vehicle or trailer with lift arms including a dump bed with lift arms and hydraulic valve operative to lifting the lift arms, hydraulic sensors joined to the hydraulic valve, a bucket on an end of the lift arms, a camera positioned to view a rear of the dump bed, and a computer program product which monitors a surrounding area by the camera, positions the bucket by lifting the lift arms by operation of the hydraulic valve, and ceases positioning of the bucket upon detection of an obstacle or safety hazard.

In another aspect of the present invention, the system develops an interference model based on applying one or more indications of interference captured by the camera against a system model based on known geometry of the bucket, each lift arm, and each hydraulic valve.

Advantageously, the present invention may automate operation of a vehicle or trailer with an arm lift feature, and limits human interaction, enabling more tentative observation by a user and expanding the lifespan of the unit.

The present invention provides an additional layer of safety for the operator and those in the vicinity of use.

These and other features, aspects and advantages of the present invention will become better understood with reference to the following drawings, description, and claims.

DETAILED DESCRIPTION OF THE INVENTION

Figure 1:
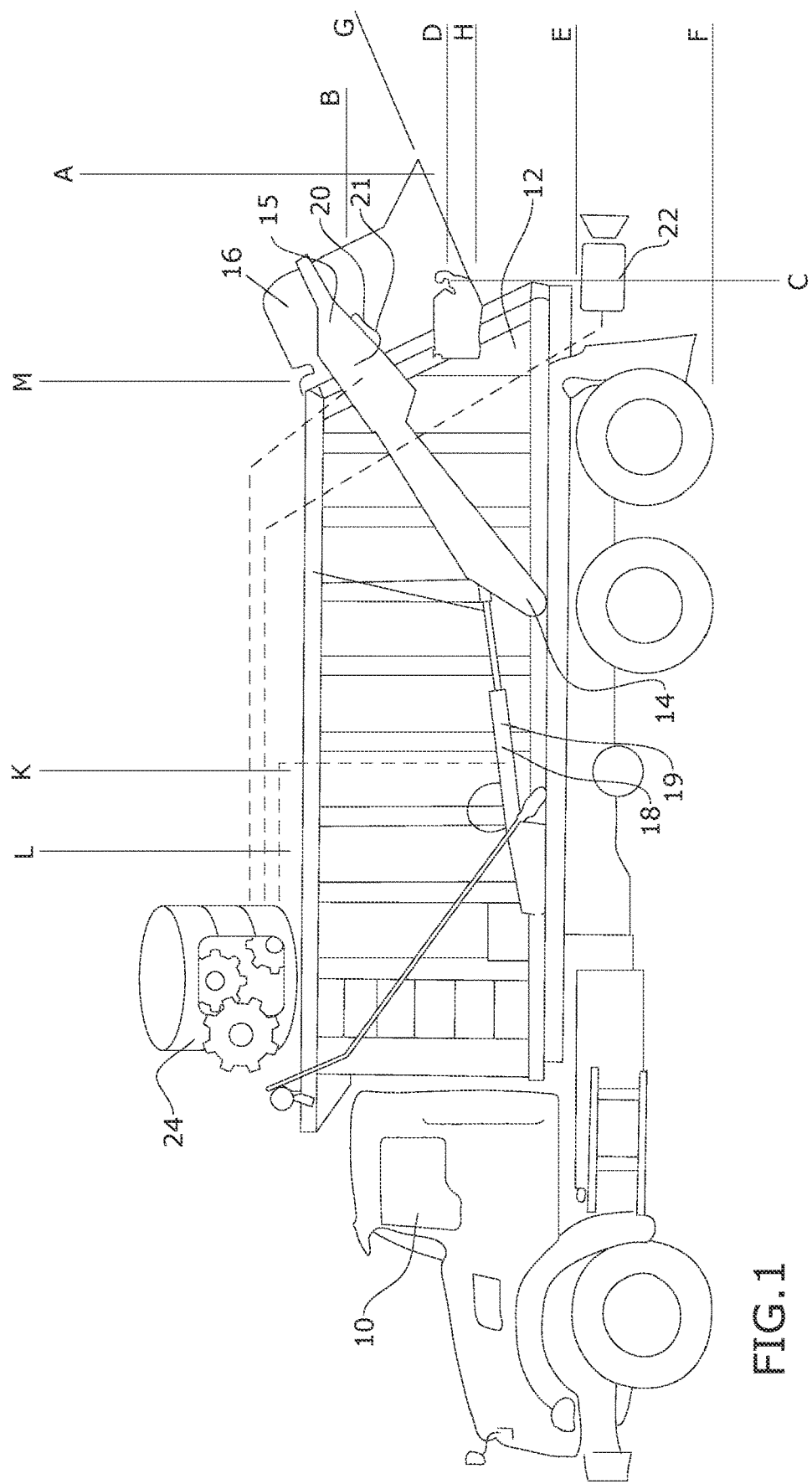
FIG. 1 is a schematic view of a dual arm truck according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

A general overview of the various features of the invention will be provided, with a detailed description following. Broadly, an embodiment of the present invention provides safety control elements and elements for controlling lift arms on a vehicle or trailer with arm lifts. The present invention may comprise sensors, logic, and visual detection incorporated into a vehicle or trailer with lift arms to add safety and finesse of operation.

The present invention may comprise installation or retrofitting of sensors and a computer programming product capable of carrying out predetermined tasks, and a cycle and calibration to ensure proper operation.

In some embodiments of the present invention, the operator may choose an operation action to operate the unit. The operation of the unit may cease upon detection of a safety hazard.

Aspects of the present invention may include: one or more sensors operative to determining a position of an arm or distance the arm needs to travel by measuring an extension of a hydraulic cylinder, one or more sensors operative to determining a position or location of a bucket by measuring an extension of the hydraulic cylinder, a software or computer program operative to determining a location and/or orientation of the arm and the bucket by the arm position sensor (hydraulic sensors), the bucket position sensor. The arm position sensor may be joined to the hydraulic cylinder or a hydraulic valve and measure the position or displacement of the hydraulic cylinder or valve. The software or computer program may include a software model of the physical system. The software model may use a known set of geometry of the system to determine an end location and interference parameters. The software model may use a training sequence completed that sets the limits for interference detection. The training sequence may be added by an installer or owner of the equipment.

The present invention may further comprise a proportional control valve operative to controlling a speed, direction and position of the arm, a proportional control valve operative to controlling a speed, direction and position of the bucket, a camera operative to detecting objects and/or interferences in the path of the arm and bucket. The camera may be positioned at the rear of the vehicle and may communicate location and/or presence of the interfering objects to a control system. The camera may utilize time of flight technology. The camera may monitor a surrounding area and detect obstructions or safety hazards in the way of or otherwise interfering with the arm or bucket. Indications of obstructions or interferences may be determined by the software or computer program processing the images captured by the camera, thereby establishing a 'vision system'. The software or computer program may analyze the obstructions or interferences indications against the software model, thereby establishing an interference model.

A present invention may determine a path of movement for the arm and bucket. Said determination may consider the position of the arm and bucket, the interference model of the arm and bucket, and the presence of objects detected by the vision system. This determination may be completed by a software or computer program product.

The present invention may further comprise a remote control. The remote control may include a full manual control system or simplified operational buttons. Manual control of the system may move the arm and bucket to the operator command while limiting motion to avoid collisions. Operations provided on a simplified control system may include down/load, up/dump, and/or stow.

The present invention may automatically cease operation upon detection of a safety hazard.

Controls of the present invention may include stop, travel, load, and/or dump. These actions may be halted, reversed, or ceased automatically upon detection of an obstacle or safety hazard. The controls may include a push button to assume a requested position. The controls may also offer an ability to accelerate or decelerate the bucket or arms. The controls may further include an ability to maneuver manually the bucket or arms or automatically perform a required task or function, safely with an ability to cease operation upon detection of an obstacle or safety hazard.

The present invention may utilize a sensor for arm travel, a sensor for bucket location, a proportional control valve to control arm, a proportional control valve to control bucket, a camera operative to detecting interference in path of arm/bucket, and/or a remote control. Software may orient the arm and bucket based on sensed location data of the arm and/or buck and thereby determine a path of the arm and bucket. The camera or a plurality of cameras may provide additional information for the software to utilize when controlling the arm and bucket.

A computer program product may implement the software and comprise a machine-readable code, when executed, capable of implementing various functions. The functions may include detection, through application of the interference model, of an obstacle or safety hazard which may interfere with movement of the arms or the bucket. The present invention may position the arms by the hydraulic valve and position the bucket within the arms by bucket valves or bucket hydraulics. Respective sensors may be electronically paired or joined with the hydraulics and the computer program product. The sensors may monitor the position of the bucket or the arms as well as acceleration, deceleration, or movement of the bucket or arms. An unexpected acceleration, deceleration, or movement of the bucket or arms may indicate a potential obstacle or safety hazard. The detection of a potential hazard or obstacle may trigger communication with the computer program product which may result in an automatic cessation of any operation or a reverse of any operation, such as movement of the arms or bucket. The camera may also detect any obstacles or safety hazards. A detection of a potential hazard or obstacle in a path of the arms or bucket may trigger a communication with the computer program product which may result in an automatic cessation of any operation or a reverse of any operation, such as movement of the arms or bucket.

Referring now to the Figures, FIG. 1 is a schematic depiction of a dual arm truck 10 according to an embodiment of the present invention. The dual arm truck 10 includes a dump bed 12. Arms 14 extend from the dual arm truck 10 controlled by a hydraulic valve 18. A hydraulic valve sensor 19 is joined to the hydraulic valve 18 and monitors the position of the arms 14. The distal ends 15 of the arms 14 are attached to bucket 16. Bucket hydraulics 20 adjust the position of the bucket 16 within the arms 14. The bucket hydraulics 20 are joined to a bucket position sensor 21. Camera 22 is affixed at the rear of the dual arm truck 10. A computer program product 24 controls the hydraulic valve 18 and bucket hydraulics 20 and receives information from the hydraulic valve sensor 19 and the bucket position sensor 21. FIG. 1 further details various sections and values A-H and K-M discussed in FIGS. 2-7.

Figure 2:
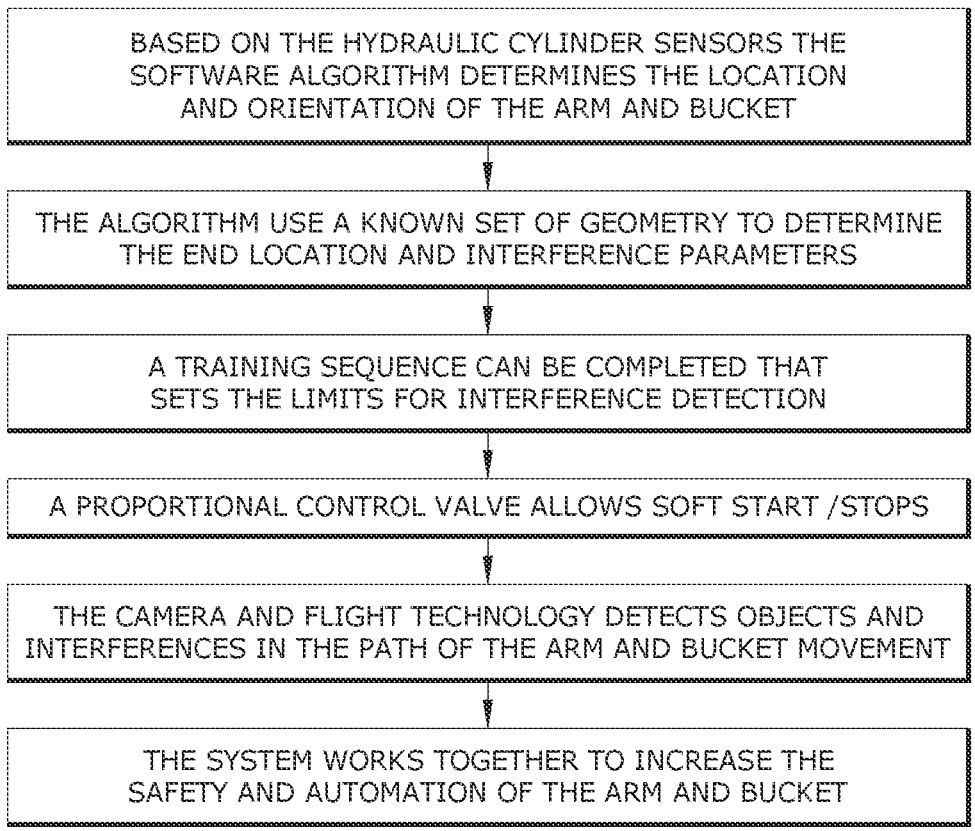
FIG. 2 discusses method steps according to an embodiment of the present invention.
Figure 3:
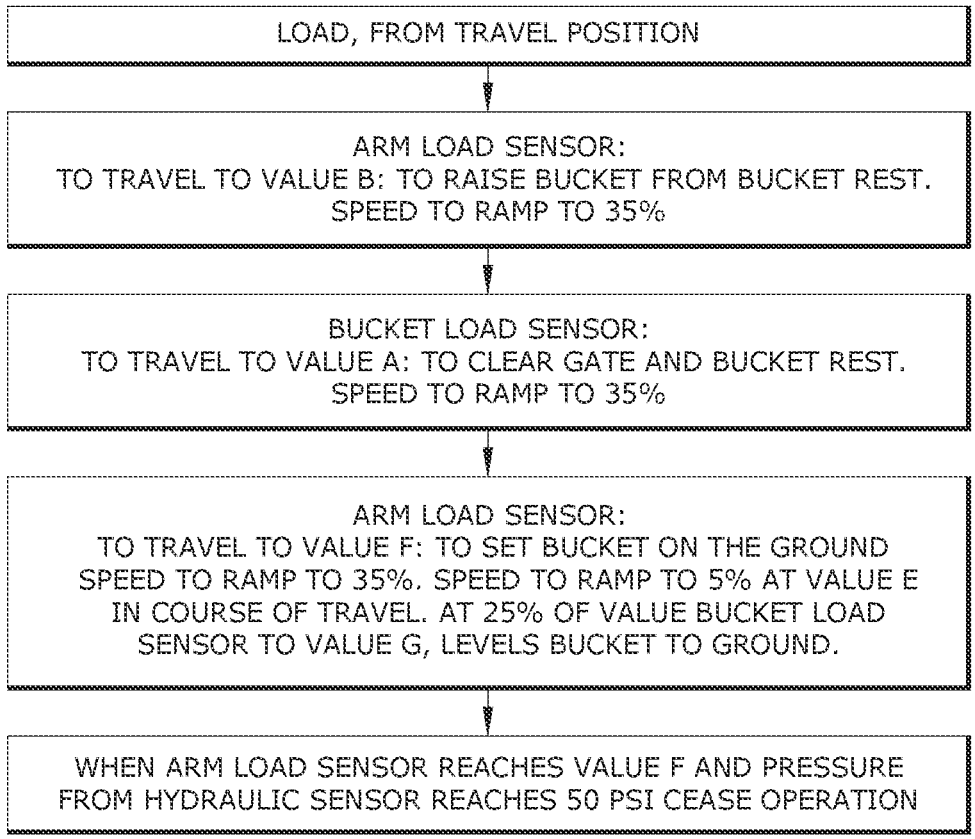
FIG. 3 details steps for a loading from travel position thereof.
Figure 4:
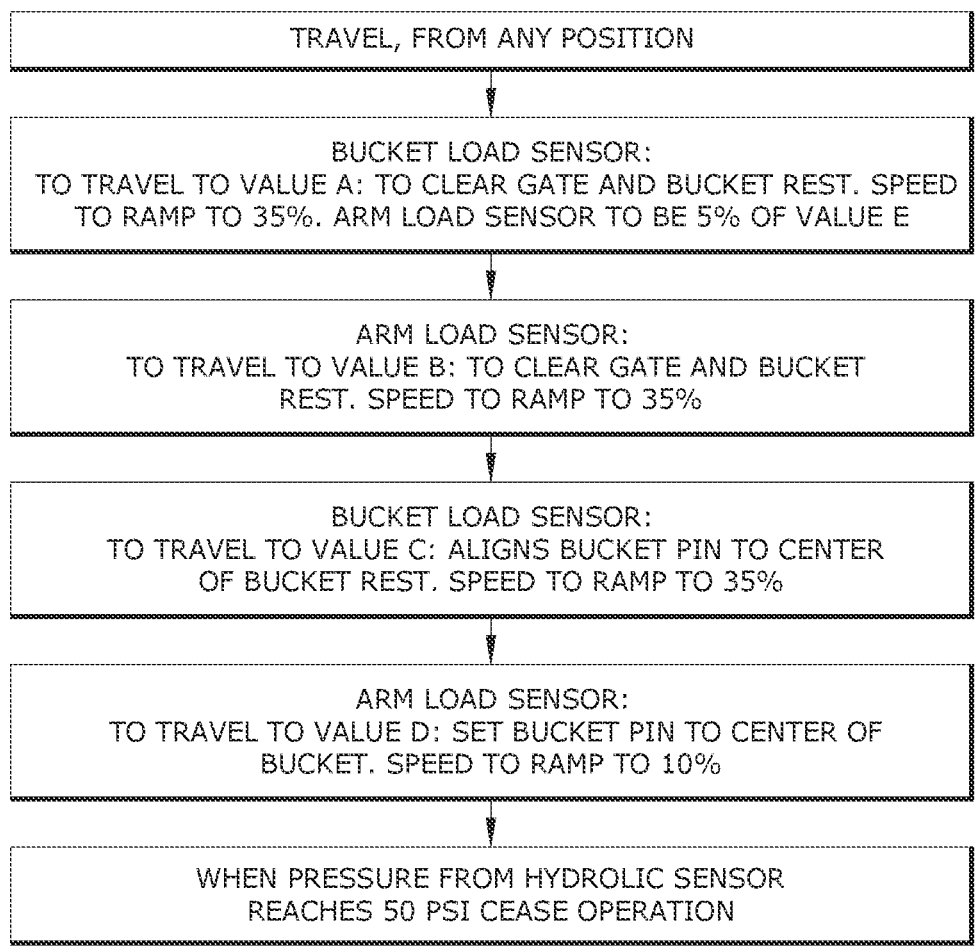
FIG. 4 details steps for travel from any position thereof.
Figure 5:
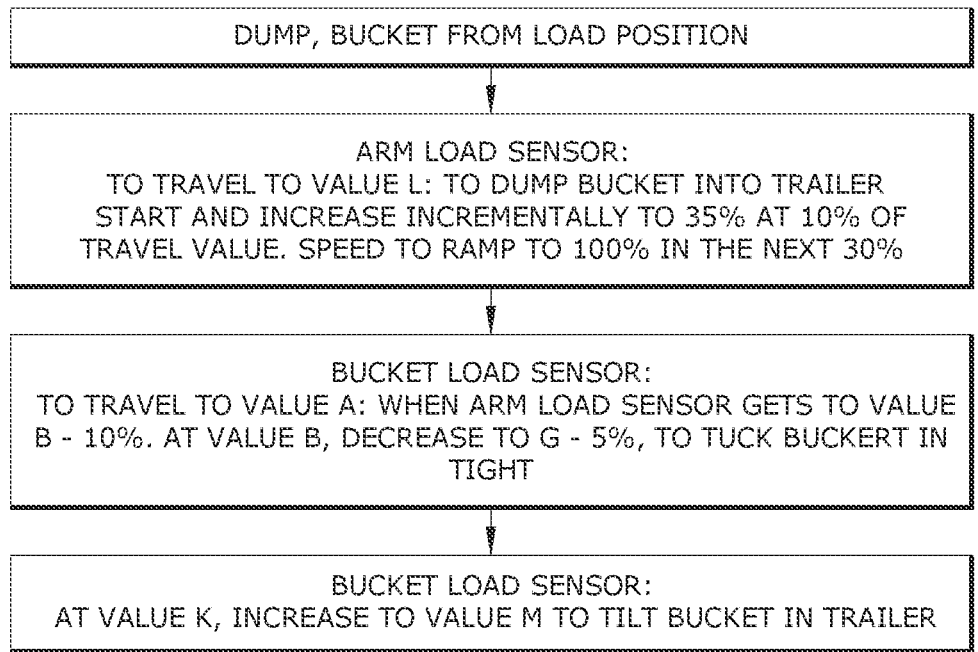
FIG. 5 details steps for dumping from a load position thereof.
Figure 6:
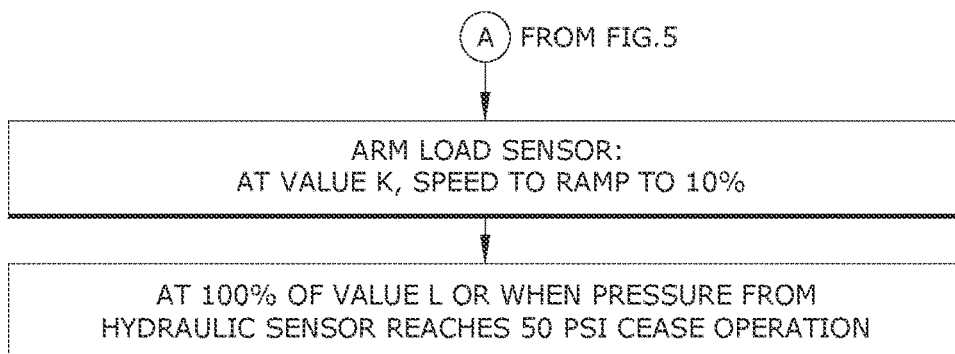
FIG. 6 is a continuation of FIG. 5.
Figure 7:
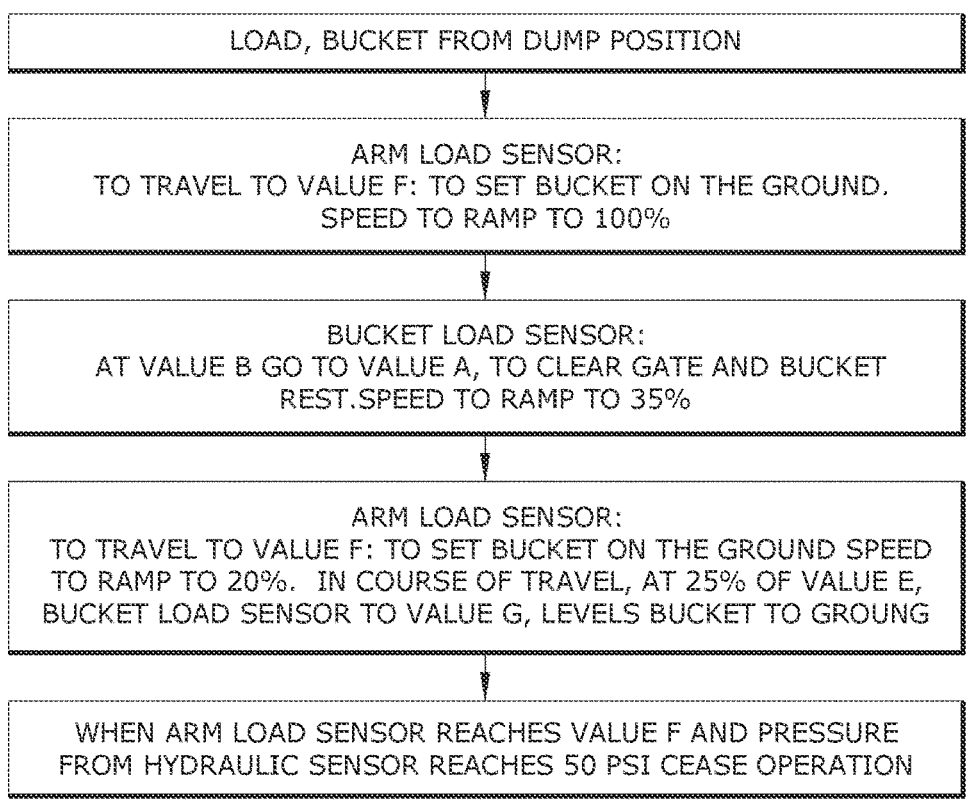
FIG. 7 details steps for a load from a dump position thereof.
Figure 8:
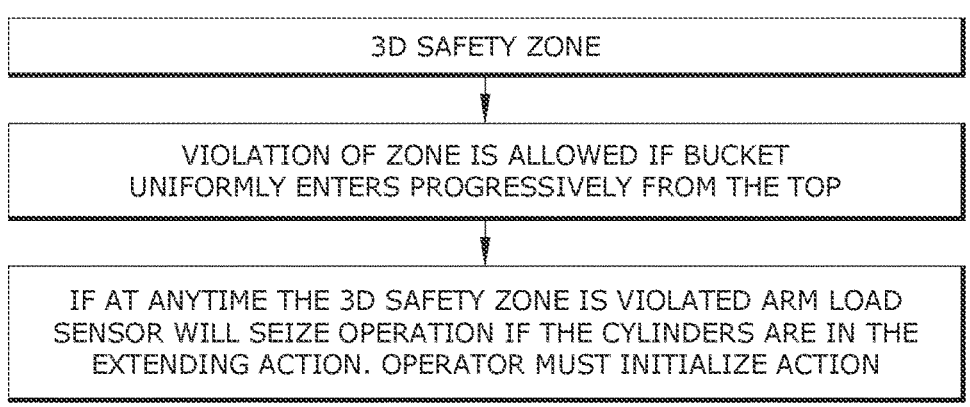
FIG. 8 details steps for a violation of a safety zone thereof.

FIGS. 2-7 are flow charts depicting operations according to an embodiment of the present invention. FIG. 2 details steps according to an embodiment of the present invention including a detection of interferences in a path of the arm and bucket movement. FIG. 3 details steps for a load travel logic. FIG. 4 details steps for a logic to travel from any position. FIG. 5-6 detail a dump bucket from a load position logic. FIG. 7 details a load bucket from a dump position logic. FIG. 8 details a three-dimensional safety zone logic.

It should be understood, of course, that the foregoing relates to exemplary embodiments of the invention and that modifications may be made without departing from the spirit and scope of the invention as set forth in the following claims.

What is claimed is:

1. A system for automation of a vehicle or trailer with lift arms comprising:
   a dump bed with lift arms and one or more hydraulic valves operative to lifting the lift arms;
   hydraulic sensors joined to the one or more hydraulic valves;
   a bucket on an end of the lift arms;
   a camera positioned to view a rear of the dump bed; and
   a computer program product comprising machine-readable program code for causing, when executed, the computer program product to perform a system method comprising the following process steps:
   monitoring a surrounding area by the camera;
   positioning the bucket by lifting the lift arms by operation of the one or more hydraulic valves;
   ceasing positioning of the bucket upon detection of an obstacle or safety hazard; and
   developing an interference model based on applying one or more indications of interference captured by the camera against a system model based on known geometry of the bucket, each lift arm, and each hydraulic valve.

2. The system of claim 1, wherein the obstacle or safety hazard is detected by the camera.

3. The system of claim 1, wherein the obstacle or safety hazard is detected by the hydraulic sensors.

4. The system of claim 1, further comprising:
   bucket hydraulics operative to adjusting a position of the bucket within the lift arms; and
   a bucket position sensor.

5. The system of claim 4, further comprising the machine-readable program code of the computer program product for causing, when executed, the computer program product to perform a system method comprising the following process steps:
   positioning the bucket by operation of the bucket hydraulics; and
   ceasing positioning of the bucket upon detection of an obstacle or safety hazard.

6. The system of claim 5, wherein the obstacle or safety hazard when ceasing positioning of the bucket is detected by the camera.

7. The system of claim 5, wherein the obstacle or safety hazard when ceasing positioning of the bucket is detected by the bucket position sensor.

* * * * *